United States Patent [19]

Kitano et al.

[11] 4,214,994
[45] Jul. 29, 1980

[54] REVERSE OSMOSIS MEMBRANE

[75] Inventors: Motoi Kitano, Kawanishi; Isao Sumita, Toyonaka; Yukio Sakamoto, Mino, all of Japan

[73] Assignee: Matsushita Electric Industrial Co., Ltd., Kadoma, Japan

[21] Appl. No.: 861,191

[22] Filed: Dec. 14, 1977

[30] Foreign Application Priority Data

| Dec. 20, 1976 | [JP] | Japan | 51-153834 |
| Mar. 10, 1977 | [JP] | Japan | 52-026823 |
| Apr. 4, 1977 | [JP] | Japan | 52-038811 |
| Apr. 4, 1977 | [JP] | Japan | 52-038812 |
| Apr. 5, 1977 | [JP] | Japan | 52-039256 |
| Apr. 25, 1977 | [JP] | Japan | 52-048179 |

[51] Int. Cl.² .................................... B01D 25/04
[52] U.S. Cl. .......................... 210/490; 210/500 M; 264/135; 264/257; 428/246; 428/247; 428/252; 428/265; 428/284; 428/289; 428/290; 428/304

[58] Field of Search ........... 428/245, 246, 247, 252, 428/256, 265, 267, 284, 287, 289, 290, 304, 320; 210/490, 500 M; 264/135, 257

[56] References Cited

U.S. PATENT DOCUMENTS 4,061,821  12/1977  Hayano et al. .................. 428/304

Primary Examiner—James J. Bell
Attorney, Agent, or Firm—Cushman, Darby & Cushman

[57] ABSTRACT

In a reverse osmosis membrane of the structure of Loeb's membrane for use to purify sea-water into plain water, the membrane comprises a skin layer as an active layer and a gel layer to support the skin layer, wherein an improvement of flux, that is the (passing rate of purified water) is achievable by burying a porous sheet, such as plain-woven cloth or non-woven fabric, in the gel layer.

11 Claims, 3 Drawing Figures

REVERSE OSMOSIS MEMBRANE

BACKGROUND OF THE INVENTION

This invention relates to an improvement in an asymmetric membrane comprising a gel layer and a skin layer formed thereon for use as a reverse osmosis membrane.

A membrane having known Loeb's construction, which has skin layer as an active layer on a face to contact the fed or supplied water and a gel layer for supporting the skin layer on the other side, has been generally used as an efficient reverse osmosis membrane, Ordinarily, such a membrane has been made by, first, applying a suitable solution of high polymer synthetic resin on a porous sheet of fabric or porous plastic film, next, evaporating the solvent to form a skin layer and underlying layer of high polymer resin and then immersing the resultant composite sheet in a gelation liquid thereby to form the Loeb's construction comprising an active skin layer and a supporting gel layer. In such conventional Loeb's construction membrane, the porous sheet remains contact with the gel layer in use. In the conventional semipermeable membrane, a densely woven thick plain-woven cloth, called taffeta, has been generally used to support the Loeb's membrane. In such a membrane, the sheet of the supporting cloth only serves for supporting the membrane.

In the semipermeable membrane, it is an important problem to achieve a higher flux. However, hitherto, it has been difficult to increase the flux without deteriorating rejection against solute of the fed liquid.

The present inventors have found an improved construction of the semipermeable membrane wherein the flux is increased without deteriorating the rejection.

SUMMARY OF THE INVENTION

The purpose of the present invention is to obtain an improved reverse osmosis membrane having a higher flux without decrease of the rejection by solute in the fed liquid in comparison with the conventional semipermeable membrane.

DETAILED DESCRIPTION OF THE INVENTION

Figure 1:
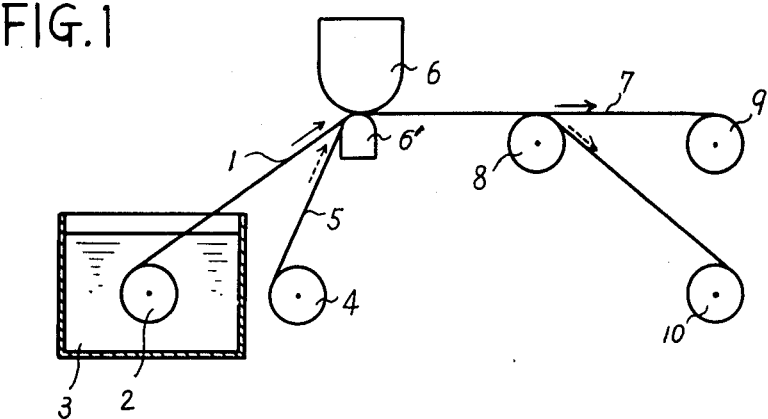
FIG. 1 shows one example of the apparatus to make one membrane embodying the present invention.

As a result of many experiments the inventors found that an improved Loeb's construction membrane, wherein the porous sheet such as plain-woven cloth is buried in the gel layer performs an improved flux without decreasing rejection by the solute in the fed water.

Namely, according to the present invention, it is found that the buried porous sheet serves to increase flux of the membrane.

In general, the asymmetric reverse osmosis membrane comprises a several hundred Å thick active layer called skin layer and an underlying gel layer which supports the very thin and fragile active layer. The gel layer is generally from several tens $\mu$m to several hundreds $\mu$m thick and passes the liquid purified by the active layer therethrough.

The porous sheet buried in the gel layer serves to increase the flux.

The porous sheet to be buried in the gel layer is preferably a plain-woven cloth having only a small elasticity, namely taffeta, sheer or gauze or of non-woven fabric of small elasticty. In general, the sheer implies fabrics coarsely woven with fine fibre and taffeta implies a plain-woven fabrics of thicknesses larger than the sheer. The gauze is considered as a modification of the plain-woven fabric, and therefore, hereinafter is defined to be included in the plain-woven fabric. Namely, in the present invention, the taffeta, sheer and gauze are included in the plain-woven fabric. Elastic cloth, namely knit fabric such as of tricot, lace, pile and jersey are not suitable as the porous sheet because the membrane becomes excessively distorted when a large pressure is applied thereon. A suitable thickness of the porous sheet depends on the type of weaving, material yarn and size of the membrane, but in general, the thinner the gel layer is the thinner the sheet must be, in order that the porous sheet is entirely buried in the gel layer.

The inventors empirically found that in the reverse osmosis membrane of the present invention, a drastic increase of the flux is achievable without decrease of rejection of solute in spite of the fact that burying of the porous sheet in the gel layer decreases actual thickness of the gel part. The empirical study revealed that the inserted porous sheet functions to improve the flux of the gel layer and also that the increase of the flux depends on the kind and nature of the sheet, namely the kind of weaving, size of the texture and material of the cloth. As a conclusion, it is found that a cloth woven densely with fine fibre is most effective in improving the flux of the membrane.

Making of the semipermeable membrane is as follows: A dope solution is made by dissolving acetylcellulose, acetylbutylcellulose, aromatic polyamide, polysulphone, polyphenylenoxide or the like in acetone and or formamide, and the dope solution is cast on a glass boat with the porous sheet disposed on the bottom. Then, after the porous sheet is submerged in the solution, the solvent of the solution diffuses in the fabrics and evaporates substantially through the fabrics, thereby forming a high polymer resin layer containing the buried porous sheet therein. By means of a known principle, an active layer is formed on the resin layer.

Thereafter, the resultant composite layers are immersed in the cold water to form a layer of gel of the high polymer resin.

Consideration should be taken into account concerning the relation between viscosity of the doping solution and the size of the texture, that is size of net of the cloth. When a highly viscous dope solution is used together with fine texture fabric, then the resultant membrane is likely to have undesirable bubbles in the gel layer, and the bubbles spoil the rejection.

Concerning the fibre constituting the sheet of cloth, there are three kinds of fibres, namely yarn which is made of short fibre, spun filament which is made of long filament and monofilament which has simple construction of single filament per se. Among these three kinds of fibres, cloths made of monofilament make the fewest bubbles, the spun filaments follow next and the yarns make the most bubbles.

The increase of flux of the membrane depends also on number and thinness of the fibre. An optimum result is achieved by using fibres of 5 to 20 denier at a density of over 50 fibres per 1 inch (2.54 cm). Thickness of a 5 denier monofilament cloth is about 40 μm and the thickness of a 20 denier monofilament cloth is about 80 μm. When multifilament fibres are used instead of the monofilament, the cloth can be made some 20% thinner than the abovementioned. Therefore, by using the multifilament cloth, it is possible to make thinner membranes.

Flux of a reverse osmosis membrane of 100 μm thick made by burying in a gel layer a cloth woven with 10 denier monofilament fibre at the rate of 250 fibres per 2.54 cm is three times larger than that of the semipermeable membrane of the same 100 μm thickness and without the cloth, and the rejection is also satisfactory.

Flux of the similar reverse osmosis membrane wherein the same fibres are woven at the rate of 200 fibres per 1 inch has the flux as 2.5 times as large as that of the similar semipermeable membrane without the cloth.

The comparison of the abovementioned examples shows that the larger the density of the fibre is the higher the flux becomes.

Flux of the similar semipermeable membrane wherein cloth is woven with 20 denier monofilament fibre at the rate of 200 fibres per 2.54 cm is as 2.0 times large as that of the similar reverse osmosis membrane without the cloth. A large increase of flux is observed with cloth of finer fibres than 20 denier.

Similar results are observed for the membrane with similar cloth woven with multifibre filament, but care must be taken in order to prevent generation of bubbles in the gel layer. The bubbling can be prevented by preliminarily coating the multifibre filaments with a high polymer resin such as polycarbonate resin or melamine resin.

Cloth of many kinds of fibres, for example, of a viscose rayon, an acetate, a polyamide, a polyacrylonitrile or a polyester can be successfully used, but cloth of polyester fibre is most effective in improving the flux.

EXAMPLE I

On a glass plate is placed a sheer which is woven with warps and woofs both of 15 denier polyester monofilament fibres at the density of 200 fibres per 2.54 cm. Then a dope solution prepared by dissolving 25 parts by weight of acetylcellulose into 75 parts by weight of a 3:2 blended solvent of acetone and formamide is cast on the cloth and swept by a glass rod so as to obtain a thickness of about 100 μm of the composite layer. The composite layer is then kept alone for about 1 minute for evaporating the solvent and then is immersed in a cold water bath. By peeling the layer off the glass plate, a reverse osmosis membrane comprising a buried cloth is obtained.

The membrane is further heat treated at 85° C. for 5 minutes and is aged for 5 hours in water of 100 static atmosphere to remove initial compaction.

The completed reverse osmosis membrane is measured for reverse osmosis characteristics in 5000 PPM NaCl aqueous solution under the condition of 25° C. and 30 Kg/cm² pressure.

Measurements are made for similar reverse osmosis membranes which are made with cloths of monofilament fibres of 5 denier, 10 denier, 20 denier and 25 denier, all woven with the density of 200 fibres per 2.54 cm. Also, another measurement is made for a reference sample of a conventional reverse osmosis membrane without buried cloth but made by similar process.

The characteristics of the abovementioned 7 membranes are shown in Table 1.

Table 1

| Thickness of fibre of buried cloth (denier) | Flux (ton/m² . day) | Rejection (%) |
|---|---|---|
| 5 | 1.45 | 95.1 |
| 10 | 1.32 | 95.3 |
| 15 | 1.03 | 95.0 |
| 20 | 0.71 | 94.9 |
| 25 | 0.59 | 94.7 |
| 30 | 0.54 | 94.2 |
| Conventional membrane without cloth | 0.54 | 94.7 |

EXAMPLE II

Several reverse osmosis membranes all of 100 μm thickness with buried-in cloths woven with 10 denier monofilament fibres with various densities per 2.54 cm are made by similar process to that of Example I. Measured performance characteristics of the membranes are shown in Table 2

Table 2

| Densities of fibres per 2.54cm | Flux(ton/m² . day) | Rejection (%) |
|---|---|---|
| 250 | 1.62 | 96.1 |
| 200 | 1.34 | 96.3 |
| 150 | 1.03 | 95.7 |
| 100 | 0.76 | 95.9 |
| 50 | 0.64 | 95.3 |
| 30 | 0.55 | 94.8 |
| Conventional membrane without cloth | 0.54 | 94.7 |

EXAMPLE III

A reverse osmosis membrane of 100 μm thickness with buried-in cloth is made by similar process to that of the Example I. The cloth buried in the gel layer is a sheer which is woven with 20 denier polyester multifilament fibre with density of 200 woofs in 2.54 cm and 230 warps in 2.54 cm. Under the same conditions of the measurement as those of the Example I, the measured characteristics are:
Flux 1.54 ton/m².day
Refection 95.3%.

In a modified Example wherein warps and woofs of the cloth are both 20 denier multi filaments, similar characteristics are obtained.

EXAMPLE IV

A reverse osmosis membrane of 100 μm thickness with buried-in cloth is made by similar process with that of the Example I. The cloth buried in the gel layer is sheer woven with 15 denier polyester monofilament fibre with densities of 200 woofs and 200 warps per 2.54 cm. The characteristics measured under the same conditions as those of the Example I are:
Flux 1.83 ton/m².day
Refection 95.7%.

EXAMPLE V

A reverse osmosis membrane of 100μm thickness with buried-in cloth is made by similar process with that of the Example I. The cloth buried in the gel layer is the same sheer as that of Example III, namely woven with 20 denier polyester multifilament fibres with density of 200 woofs and 230 warps per 2.54cm. The cloth is preliminarily treated by a resin solution prepared by dissolving 10 weight % of polycarbonate in a 1:1 blended solute of dichroloethane and dichrolomethane to form a coating of the polyester resin, and the treated cloth is buried in the gel layer. As a result of the resin treatment, there are very few bubbles in the gel layer.

Under the same condition of the measurement as those of Example I, the measured characteristics are:

Flux: 1.49 ton/m$^2$.day

Refection: 95.3%

As a modified Example wherein the cloth is preliminary treated with melamine resin, characteristics are similar to the above.

The inventors further made research about effects of the types of texture in increase of flux. In plain-woven cloth there are many through-paths since every warps and woofs are not parallelly disposed but are disposed waving alternately. However, in some kind of cloths, some part of warps and woofs are parallelly disposed, and therefore, the total of the area of through-paths between the fibres are very small in comparison with the plain-woven cloth. Such smallness of the area of the through-path is observed also in cloths wherein either of woops or woofs are very much thinner than the others, or in cloth wherein either of woops or woofs have very much higher Young's modulus than the others. The inventors found that when such cloths of small area of through-paths are used as the porous sheet, a satisfactory increases of flux were not achievable. Also the inventors found that, when the cloth is made with fibres of over 300 denier, a satisfactory increase of flux was not achievable. Further, the inventors found that when the cloth has very smooth surface due to having a considerable parts of parallel arrays of fibres on one face, and on the otherhand has very rugged and porous texture on the other face thereof, the rugged face should be disposed to the side of the active layer.

Inventor's empirical study revealed that the effect of increase of the flux is achieved during the process of forming the active layer and the gel layer. Namely, the fibres of the cloth helps diffusing out and evaporation of the solvent (formamide and acetone) and the swelling agent (formamide in the solvent), and further improve the characteristics of the surrounding gel layer and the overlying active layer. It can be hypothetically elucidated that as a result of the abovementioned improvements, the flux is increased without spoiling rejections. When a cloth of a type of coarse net is buried in the gel layer, in the center part of the mesh of the net the gel is not sufficiently affected by the existence of the fibre. However, even when such unaffected center part and well affected adjacent part coexist in a membrane, the flux increases to a considerable extent.

For the fibres of the cloth, polyester, polypropylene, nylon, vinyl, cotton, wool, silk or flax can be used. Types of the fibres can be monofilaments, multifilaments, yarn, twisted thread or textured yarn.

In the following example shown in Table 3, several reverse osmosis membranes are made with several different types of cloths buried in the gel layers.

For the high polymer resin, the acetylcellulose No. E398-3 prepared by Eastman Kodak Company of the USA is used. For the solute of 25 parts by weight of the abovementioned acetylcellulose, 75 parts by weight of solvent is prepared by mixing 45 parts by weight of acetone and 30 parts by weight of formamide. The membrane is made by the similar process with the foregoing examples. The cloth are woven by 20 denier filaments of same Young's moduli with densities of 500 fibres per Cm.

Plain-woven cloth, gauze cloth, twill woven cloth and satin cloth are used as the porous sheets. In the twill weave, 3 woofs cross over one warp. The satin is woven as 2 shipswarp. The twill and the satin were not suitable for use in the present invention because they had considerable parallel fibres parts. All the cloths are made 150 μm thick. The reverse osmosis characteristics are measured by feeding 2000 ppm NaCl aqueous solution with the pressure of 30 Kg/Cm$^2$.

Table 3

| Buried Proous Sheet | Rejection (%) | Flux (m$^3$/m$^2$ . day) |
|---|---|---|
| Membranes of the Prior Art   None | 93 | 0.49 |
| Plain weave cloth is attached on the rear face (not buried). | 93 | 0.50 |
| Twill weave cloth | 93 | 0.31 |
| Satin weave cloth | 93 | 0.29 |
| Gauze weave cloth | 94 | 0.99 |
| Plain weave cloth | 94 | 1.21 |

As is understood from the abovementioned Table 3, the reverse osmosis membranes of the present invention show superior characteristics.

Further, in order to fully give heat-and pressure-resistances to the reverse osmotic membrane of the present invention, it is preferably that, as described in the following Example VI, at least two porous sheets, each having different areas of apertures thereon, are put on each other and then together buried into the gel part of the semipermeable membrane with their face parallel to the face of the membrane.

EXAMPLE VI

A dope solution as a material for the reverse osmosis membrane is prepared by dissolving cellulose acetate of 25 parts by weight into a mixture of formaldehyde of 30 parts by weight and acetone of 45 parts by weight. On the other hand, two or more porous sheets having different areas of apertures from each other are piled on a plate with a smooth surface such as glass or plastics. Next, the abovementioned dope solution is cast on the plate to impregnate both face of the porous sheets. The dope solution on the upper-most face thereof is swept with a glass bar so as to make the face smooth. Then, the sheets and the plate on which the dope solution is cast are allowed to stand for 1 minute so as to evaporate the solvent in the dope solution, followed by peeling the resultant membrane off the plate and a soak into a cold water at 3° C. to gelate the dope solution. Thus, a reverse osmotic membrane containing the porous sheets is completed.

Six kinds of reverse osmotic membranes, wherein porous sheets are of polyethylene terephthalates, fabric of nylon, etc., are made according to the abovementioned way.

Table 4 shows characteristics of these six kinds of membranes which were examined with a fed water containing NaCl of 1,500 ppm at 50° C. under the pressure of 50 Kg/cm$^2$. As a reference, a control membrane without any porous sheet to be compared with these six kinds of membranes of the present Example VI was manufactured in the similar manner to the present Example VI.

From the table 4, we can see that the flux rises the higher when the smaller the area of apertures (i.e., mesh) of the porous sheet disposed closer to the surface of the active layer is; whereas the rejection against the salt rises the higher when the wider the area of aperture of the porous sheet disposed closer to the surface of the active layer is. Therefore, the abovementioned reverse osmotic membranes with only a area of apertures are especially useful to purify low concentration saline water, whereas the abovementioned membrane with wide area of apertures is especially useful for turning a high-concentrated saline water, for example, a sea water into a purified water.

As the porous sheets, there are natural fabrics such as cotton, flax and wool, non-woven fabrics, webs and nets make of artificial fabrics such as viscose rayon, cellulose acetate, polyesters, polyamides, polyolefines and vinyl, porous plastic films, metallic nets etc.

The reverse osmotic membranes of the above Example VI exhibit excellent characteristics even under a severe condition of considerably high pressures and high temperatures compared with that of the conventional reverse osmotic membranes, and thus are industrially useful.

Table 4

| Reverse Osmotic Membrane No. | Buried Porous Sheet | Order of Disposition of Porous Sheet counted from Membrane-surface | Aperture-Area (mm ×mm) & Fiber-diameter (mm) | Rejection (%) | Flux m³ m² . day |
|---|---|---|---|---|---|
| 1 | Two sheers of polyethylene phthalate | 1 | 0.1 ×0.1 0.03 | | |
| | | 2 | 0.02 × 0.02 0.04 | 94 | 0.82 |
| 2 | Two sheers of polyethylene terephthalate | 1 | 0.2 × 0.2 0.04 | | |
| | | 2 | 0.1 × 0.1 0.03 | 98 | 0.47 |
| 3 | Two sheers of polyethylene terephthalate | 1 | 0.1 × 0.1 0.03 | | |
| | | 2 | 0.5 × 0.5 0.10 | 94 | 0.98 |
| 4 | Three sheers of polyethylene terephthalate | 1 | 0.1 × 0.1 0.03 | | |
| | | 2 | 0.5 × 0.5 0.10 | 93 | 0.10 |
| | | 3 | 1 × 1 0.20 | | |
| 5 | Sheer of polyethylene terephthalate and cloth of nylon | 1 | 0.5 × 0.5 (Sheer) 0.1 | | |
| | | 2 | 0.05 × 0.5 (Cloth) 0.06 | 97 | 0.45 |
| 6 | Cloth of nylon and net of stainless steel | 1 | 0.05 × 0.5 (Cloth) 0.06 | | |
| | | 2 | 0.5 × 0.5 (Net) 0.1 | 94 | 0.87 |
| Control Membrane | None | — | | 82 (93)* | 0.44 (0.43)* |

Note:
*indicating data under pressure of 30 kg/cm2 at 25° C.

The following Example VII shows further reverse osmotic membranes having characteristics improved more than those of the abovementioned membranes in Example VI.

EXAMPLE VII

The reverse osmotic membranes were produced, under the similar conditions to the above Example VI, with using a dope solution which was prepared by mixing acetone and formaldehyde of 45 parts by weight and 30 parts by weight, respectively, and 25 parts by weight of a synthetic resin of acetyl cellulose (No. E 398-3), as high-polymer materials for the reverse osmotic membrane, produced in the Eastman Kodak Co. in the U.S.A. The porous sheets buried within the membranes are 150 μm thick, and the overall thickness of the membrane is 200 μm. The characteristics of the reverse osmotic membranes were examined with a fed water containing NaCl of 200 ppm under the pressure of 30 Kg/cm². The examined results are shown in Table 5.

TABLE 6

| Reverse Osmotic Membrane No. | Buried Porous Sheet | Active Layer is | Rejection (%) | Flux m³ m² . day |
|---|---|---|---|---|
| 1 | Porous film of polysulphone | concave | 93 | 1.35 |
| 2 | Porous film of polysulphone | convex | 91 | 0.42 |
| 3 | Cotton gauze | concave | 93 | 1.11 |
| 4 | " | convex | 92 | 0.05 |
| 5 | Silk plain woven fabric (Taffeta) | concave | 92 | 0.89 |
| 6 | Silk plain woven fabric (Taffeta) | convex | 90 | 0.38 |
| 7 | Polyester twill weave | concave | 94 | 0.99 |
| 8 | " | convex | 93 | 0.31 |
| 9 | Polyester sheer | concave | 93 | 1.21 |
| 10 | " | convex | 92 | 0.6 |
| 11 | Nylon sheer | concave | 93 | 1.48 |
| 12 | " | convex | 92 | 0.41 |
| 13 | Polyester gauze | concave | 91 | 1.42 |
| 14 | " | convex | 91 | 0.61 |
| 15 | Polyester knit | concave | 92 | 1.00 |
| 16 | " | convex | 92 | 0.09 |
| 17 | Porous nylon film | concave | 93 | 1.21 |

TABLE 6-continued

| Reverse Osmotic Membrane No. | Buried Porous Sheet | Active Layer is | Rejection (%) | Flux m³/m²·day |
|---|---|---|---|---|
| 18 | " | convex | 91 | 0.71 |
| 19 | Nylon satin | concave | 93 | 0.97 |
| 20 | " | convex | 93 | 0.32 |
| 21 | None | — | 90 | 0.68 |
| 22 | Nylon non-woven fabric | concave | 93 | 1.24 |
| 23 | " | convex | 93 | 0.41 |

The Table 5 emprically shows that the flux of the reverse osmotic membranes satisfactorily rises, when the reverse osmotic membrenes are produced so as to curl with its active layer made concave upon heating; whereas the flux is generally equal to or lower than that of the membrane without any porous sheets in the gel layer, when the reverse osmotic membranes are produced so as to curl with its active layer made convex upon heating. Accordingly, in order to obtain a membrane of high flux, the cloth used should clear the abovementioned test.

The abovementioned phenomenon is principally affected by the location of porous sheets in the membranes and it is also affected by the materials of the membranes, the sizes and the distribution of apertures in the gel layer, the thickness of the active layer, the membranes and the porous sheets, and the materials, the configuration and the sizes of texture of the porous sheets.

It was empirically confirmed that the generally same effort as described above can be also attained in a case using other materials for the membranes and the porous sheets.

Furthermore, it was empirically confirmed that when a net is buried within the membrane of the present invention to form a composit membrane, the membrane exhibits excellent fractional characteristics.

From viewpoint of easy manufacturing of the membrane, a so-called cloth such as a plain woven cloth is proper rather than the net. For materials of the net, polymers such as polyolefines, polycarbonates, polyethylene phthalates and nylon, metals such as stainless steel and copper are suitable. Meshes of the net can be shaped into various forms such as hexagons, squares, rectangles and triangles. The sizes of meshes of the net, have a relation with the abovementioned fractional characteristics, and their preferable range is from 0.001 mm² to 10 mm².

The abovementioned membrane containing the net has the same flux with that of the membrane per se notwithstanding the fact that it has apertures with nearly same diameters and thus has an excellent fractional characteristic. Additionally, the membrane can resist a high pressure and hence is stable for a long time.

Figure 2:
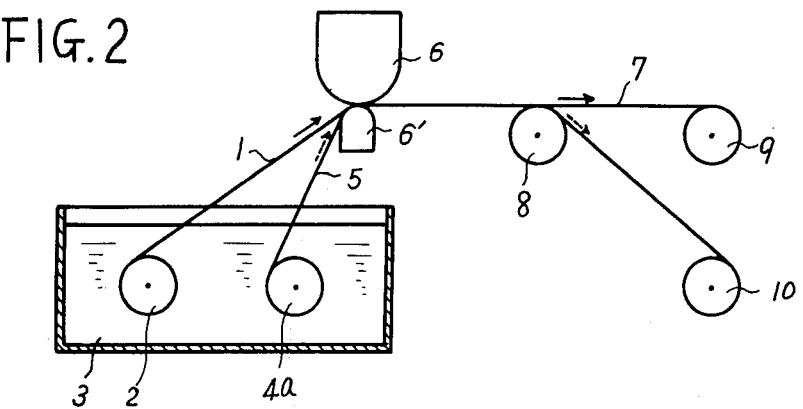
FIG. 2 shows another example of the apparatus to make another membrane embodying the present invention.
Figure 3:
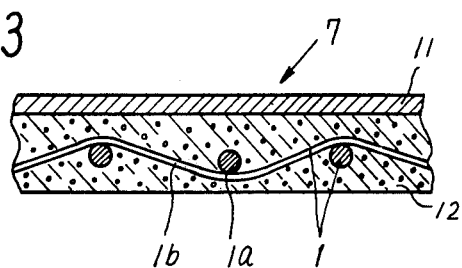
FIG. 3 is a sectional view of a membrane embodying the present invention.

Method of continuous manufacturing of the reverse osmotic membrane in an industrial scale is illustrated referring to FIG. 1, FIG. 2 and FIG. 3. Cloths described below mean woven fabrics (e.g. sheer or gauze) and knitted fabrics of filaments, yarns, textured yarns etc. of polyesters, polyprophlenes, nylons, vinyls, cotton, wool, silk, flax, carbon fibers and etc. Film described below means plastic films made of the aforementioned polymers, foils and thin sheets of metals etc.

First, the cloth 1 from a roll 2 is soaked in a polymer solution 3 which can form the reverse osmotic membrane. Therefore, the cloth 1 becomes impregnated with the polymer solution 3. The cloth 1 is put on a film 5 from a roll 4, and then is led to pass through a narrow gap between a pair of curved surfaces 6 and 6'. By the passing through the gap the polymer solution on the cloth 1 is moulded to form the membrane-structure with the buried cloth 1 therein.

Since the curved surfaces 6, 6' are fixed with their opposing top faces parallel with each other and their curvature-radii differ from each other, pressures impressed by the curved surfaces 6,6' on both face of the cloth 1 are different. As a result, the thickness of the layers of polymer solution on the front and rear face of the cloth 1 become different from each other. Therefore, by suitably selecting the curvature-radii of the surfaces 6 and 6', the thicknesses of the layers of polymer solution on the front face and the rear face of the cloth 1 can be desirably controlled. As the cloth travels from the gap to a roller 8, the front face (the opposite face to the film 5) of the cloth 1 becomes an active layer 11 by a vaporization therefrom of the solvent in the polymer solution while the remaining portion (contacting the film 5) of the membrane becomes a gel layer 12 because the film 5 prevents the solvent from vaporizing. Accordingly, the reverse osmotic membrane 7, namely Loeb's membrane containing the cloth 1, is formed as shown in FIG. 3. In FIG. 3 numeral references 1a and 1b, respectively, indicate a warp and a woof of the cloth 1.

Secondly, the reverse osmotic membrane 7, which is formed by burying the cloth 1 in the Loeb's membrane, and the film 5 are wound into a roll 9 and a roll 10, respectively, after passing a roller 8.

It is also possible to dispose a dryer and/or a water tank in a position between the gap and the roller 8 in order to accelerate the vaporization of the solvent and/or to make the gelation according to the membrane-structure, respectively. The material of the curved surface 6 and 6' is for example a stainless steel.

Table 6 shows a relationship of the kinds and the thickness of the polymer that can form the reverse osmotic membrane (hereinafter, referred only as "polymer"), the cloth and the film substance, the curvature-radii (A mm and B mm) of the pair of curved surfaces (hereinafter, referred as A-curved surface and B-curved surface, respectively), the gap (C μm) between the A- and B- curved surfaces, and the thickness (D μm) of the polymer layer on the faces of cloth on the A-curved surface and the thickness (E μm) of the polymer layer on the face of cloth on the B-curved surface, in the above Example 9.

TABLE 7

| | Cloth | | Film | | | | | | |
|---|---|---|---|---|---|---|---|---|---|
| Polymer | Kind | Thickness (μm) | Kind | Thickness (μm) | A (mm) | B (mm) | C (mm) | D (mm) | E (mm) |
| Acetyl-cellulose | Polyester cloth | 80 | Polyester film | 50 | 30 | 20 | 140 | 6 | 4 |
| Polyamide | Cotton cloth | 100 | Poly-propylene | 50 | 50 | 10 | 170 | 15 | 5 |

TABLE 7-continued

| | Cloth | | Film | | A | B | C | D | E |
|---|---|---|---|---|---|---|---|---|---|
| Polymer | Kind | Thickness (μm) | Kind | Thickness (μm) | (mm) | (mm) | (mm) | (mm) | (mm) |
| | | | film | | | | | | |

When a sheer or a gauze is used for the abovementioned cloth 1, then both parts of the gel layers sandwiching the sheer or the gauze are firmly connected with each other through meshes of the texture of the sheer or the gauze buried in the gel layer.

Table 7 shows characteristics of the membranes in a case that the sheer and the gauze are employed as the cloth 1. The definitions of reference marks A to E in Table 8 are the same as in the above Table 6.

Table 8

| Polymer | Cloth Kind Material | Film Thickness (μm) | Kind | Thickness (μm) | A (mm) | B (mm) | C (μm) | D (μm) | E (μm) |
|---|---|---|---|---|---|---|---|---|---|
| Acetyl-celllose | Sheer, Polyester | 80 | Polyester film | 50 | 30 | 20 | 140 | 6 | 4 |
| Polyamide | Gauze, Cotton | 100 | Polypropylene film | 50 | 50 | 10 | 170 | 15 | 5 |

Table 8 shows the reverse osmosis characteristics of the two kinds of reverse osmotic membranes containing a sheer and containing a satin instead of the sheer. Both reverse osmotic membranes were heat-treated at 80° C. for 4 minutes and thereafter the characteristics were examined under the pressure of 30 Kg/cm² with a fed water containing NaCl of 5,000 ppm at 25° C.

Table 8

| Buried Porous Sheet | | | | | | |
|---|---|---|---|---|---|---|
| Kind | Material | Thickness (μm) | Polymer | Thickness (μm) | Rejection (%) | m³/m². day |
| Sheer | Polyester | 80 | Acetyl cellulose | 90 | 95.3 | 1.02 |
| Satin | Polyester | 80 | Acetyl cellulose | 90 | 94.1 | 0.54 |

The same effects are obtainable in a modified process wherein the roll 4a of the film 5 is disposed in the solution 3. Furthermore, the process can be modified to impregnate the composite sheet made by putting the cloth 1 and the film 5 on each other with the polymer solution 3 after combining thereof.

As obviously seen from the abovementioned description on the method of the present invention, the reverse osmotic membranes, especially, plane membranes, can be easily and continuously manufactured and the location of the cloth buried within the membrane can be appropriately controlled. Because of the effect of burying the cloth therein, furthermore, the reverse osmotic membranes of the present invention have the improved reverse osmotic characteristics of the excellent rejection against salts and has as 1.5 to 2 times high flux as that of the conventional membranes disposed on and supported by cloth but not containing a buried cloth therein. The reverse osmotic plane membranes of the present invention can be shaped into a cylindrical membrane etc, for actual industrial use.

What I claim is:

1. An asymmetric high flux reverse osmosis membrane of the Loeb-type comprising, in sequential combination,
    (1) a thin active layer in contact with liquid supplied to said membrane structure;
    (2) a high polymer gel layer carried on and supporting said active layer; and
    (3) at least one porous non-elastic sheet contained within and surrounded on all sides by said gel layer and spearated from said active layer for increasing the flux of said membrane.

2. A reverse osmosis membrane of claim 1, wherein said porous sheet is porous plastic film.

3. A reverse osmosis membrane of claim 1, wherein said porous sheet is made of fibers.

4. A reverse osmosis membrane of claim 1, wherein said porous sheet is selected from the group consisting of a woven fabric and non-woven fabric.

5. A reverse osmosis membrane of claim 1 wherein said porous sheet is a woven fabric with its neighboring fibres disposed in staggered waves.

6. A reverse osmosis membrane of claim 4, wherein said woven fabric is selected from the group consisting of a plain-woven cloth and gauze.

7. A reverse osmosis membrane of claim 4, wherein said woven fabric is selected from the group consisting of sheer and taffeta.

8. A reverse osmosis membrane of claim 6, wherein at least one of warps and woofs of said plain-woven cloth is thinner than 20 denier.

9. A reverse osmosis membrane of claim 6, wherein at least one of warps and woofs of said plain-woven cloth has a density of at least 50 fibers per 2.54 cm.

10. A reverse osmosis membrane of claim 1, wherein at least two porous sheets, which are piled on each other and have different areas of meshes thereof from each other, are buried in said reverse osmosis membrane in a manner to be parallel with the surface of said reverse osmosis membrane.

11. A reverse osmosis membrane of claim 1, wherein said porous sheet is arranged such as to curl with said active layer on the concave face when said membrane is heated.

* * * * *